United States Patent [19]

Walker et al.

[11] 4,117,287

[45] Sep. 26, 1978

[54] COMBINED ELECTRICAL-HYDRAULIC CONNECTOR MEANS

[75] Inventors: Raymond W. Walker, Huntington Beach; Robert M. Beard, Long Beach, both of Calif.

[73] Assignee: Compagnie Francaise des Petroles, Paris, France

[21] Appl. No.: 786,219

[22] Filed: Apr. 11, 1977

[51] Int. Cl.[2] .............................................. H02B 35/38

[52] U.S. Cl. ................................ 200/82 R; 200/61.08; 200/302; 200/81 R; 339/16 R

[58] Field of Search ..................... 200/318, 323, 81 R, 200/81.4, 81.5, 82 R, 239, 279, 302, 61.08; 339/16 R, 35, 117 R, 117 P; 213/1.3, 1.6

[56] References Cited

U.S. PATENT DOCUMENTS

| | | | |
|---|---|---|---|
| 3,649,949 | 3/1972 | McCarthy | 339/16 R |
| 3,780,243 | 12/1973 | Koomey | 200/82 R |
| 3,839,608 | 10/1974 | De Vries | 200/82 R |
| 3,845,450 | 10/1974 | Cole | 339/117 R |

*Primary Examiner*—Gerald P. Tolin
*Attorney, Agent, or Firm*—Poms, Smith, Lande & Glenny

[57] ABSTRACT

A combined electrical-hydraulic connector means including separable, elongated body members for making and breaking electrical contacts carried by said body members in spaced relation with respect to the longitudinal axis thereof, said body members providing a separable joint means transverse to said longitudinal axis. Said body members conduct pressure fluid which passes across said joint means. Seal means are provided at said joint means and are adapted to be energized to a selected compressive state. The means for actuating seal means and the electrical contact includes fluid actuating means for simultaneously energizing or de-energizing the seal means and the electrical contact means. A rapid connection or disconnection of electrical power and hydraulic power is thereby afforded.

11 Claims, 5 Drawing Figures

Fig. 2.
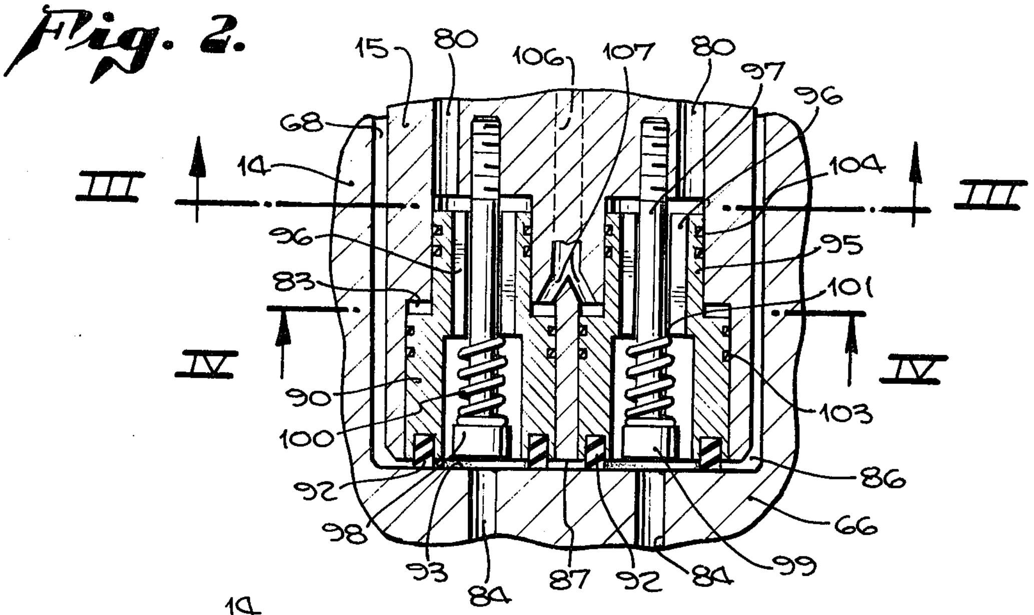
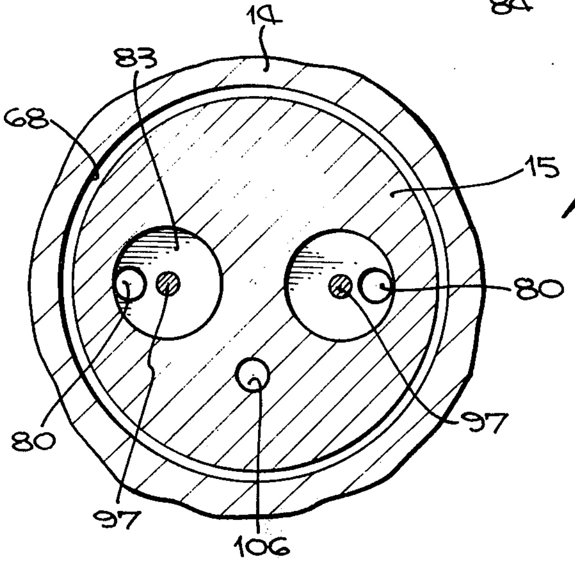
Fig. 3.
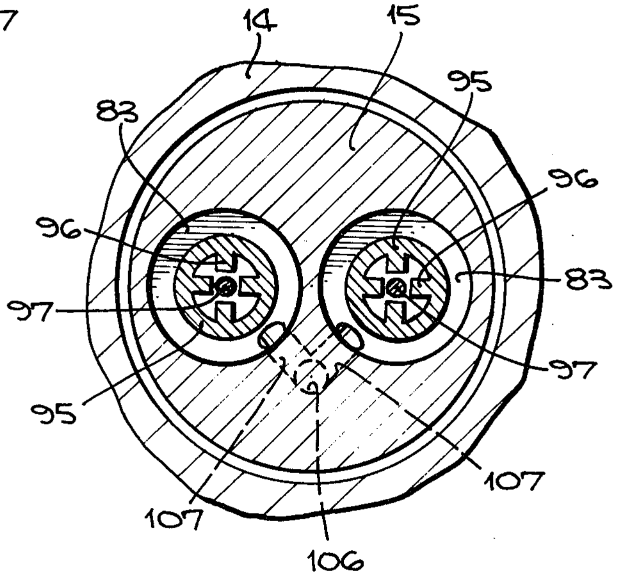
Fig. 4.

COMBINED ELECTRICAL-HYDRAULIC CONNECTOR MEANS

BACKGROUND OF INVENTION

Control systems for offshore drilling and production well operations often require the use of both electrical and hydraulic control means. In prior proposed control systems, separate control lines carried electrical and hydraulic power to the sea floor for remote control well equipment located at the sea floor. Such separate control systems included separate, independently operable connect and disconnect means usually located at the sea floor installation.

In the event of severe ocean surface conditions such as caused by high winds and waves, it may be desirable to quickly disconnect control lines from the seabed installation to avoid and limit damage to equipment both at the sea floor and at the sea surface and to permit retrieval of control lines and riser portions. Where water depth is not great, the time for retrieval of control lines and riser portions is relatively short. In deep water, the retrieval time for control lines and riser portions may require a relatively long time, for example one or more days depending upon the depth of the water. In proposed deep water production riser systems, the riser may comprise an upper, relatively short riser portion and a lower, relatively long riser portion. The upper and lower riser portions may be connected by a buoyant structure located at a suitable depth as shown in copending U.S. application Ser. No. 771,799 filed Feb. 24, 1977 and owned by a common assignee. In such a proposed riser system, it is desirable to disconnect the upper riser portion at and slightly above such a buoyant structure to permit rapid retrieval of relatively short control lines and associated upper riser portion while the lower control lines and lower riser portion are supported by the buoyant structure in upright, free-standing position. Rapid disengagement of control lines from the vicinity of the buoyant structure is desirable so that the upper control line portions and associated riser may be retrieved and recovered before damage thereto may occur because of surface storm conditions. In such a proposed production riser, it will be understood that when a rapid, quick disconnect is made of control lines and riser portions that fail-safe valves operable below the point of disconnect will prevent pollution of the surrounding sea water.

SUMMARY OF INVENTION

The present invention relates to a combined electrical-hydraulic connector means which is embodied in a compact unit or system and which is adapted to be remotely operable.

The invention particularly relates to a novel construction of an electrical-hydraulic connector means wherein electrical and hydraulic control lines may be simultaneously actuated and de-actuated.

Another object of the present invention is to provide hydraulic actuating fluid under pressure for not only actuating the electrical means, but also for actuating and sealing control fluids being conducted along the control line.

A still further object of the present invention is to provide an electrical-hydraulic connector means including an hydraulically actuated seal means for transfer of pressure fluid across a joint means between two separable body members of the connector means, said seal means including a fluid pressure actuated piston member carrying a sealing element for sealing engagement with an opposed surface on the other body member.

A further object of the present invention is to provide a combined electrical-hydraulic connector means having separable body members and hydraulically actuated lock means for holding said body members in assembled relation.

The invention contemplates a combined electrical-hydraulic connector means particularly adapted for use in a control line carrying electrical power and hydraulic power to a subsea station, said connector means being adapted to be remotely operable and constructed and arranged to provide rapid, quick connection and disconnection of the electrical and hydraulic power systems embodied therein.

Various advantages and objects of the present invention will be readily apparent from the following description of the drawings in which an exemplary embodiment of the invention is shown.

IN THE DRAWINGS

FIG. 1*a* and FIG. 1*b* are contiguous sectional views of an electrical-hydraulic connector embodying this invention, the section being taken in a longitudinal plane bisecting the connector.

FIG. 2 is an enlarged, fragmentary, sectional view at the bottom joint between separable body members and illustrating seal means for passage of hydraulic pressure control fluid from the connector means to an umbilical line extending below the connector means.

FIG. 3 is a fragmentary, sectional view taken in the transverse plane indicated by line III — III of FIG. 2.

FIG. 4 is a transverse, sectional view taken in the plane indicated by line IV — IV of FIG. 2.

Figure 1A:
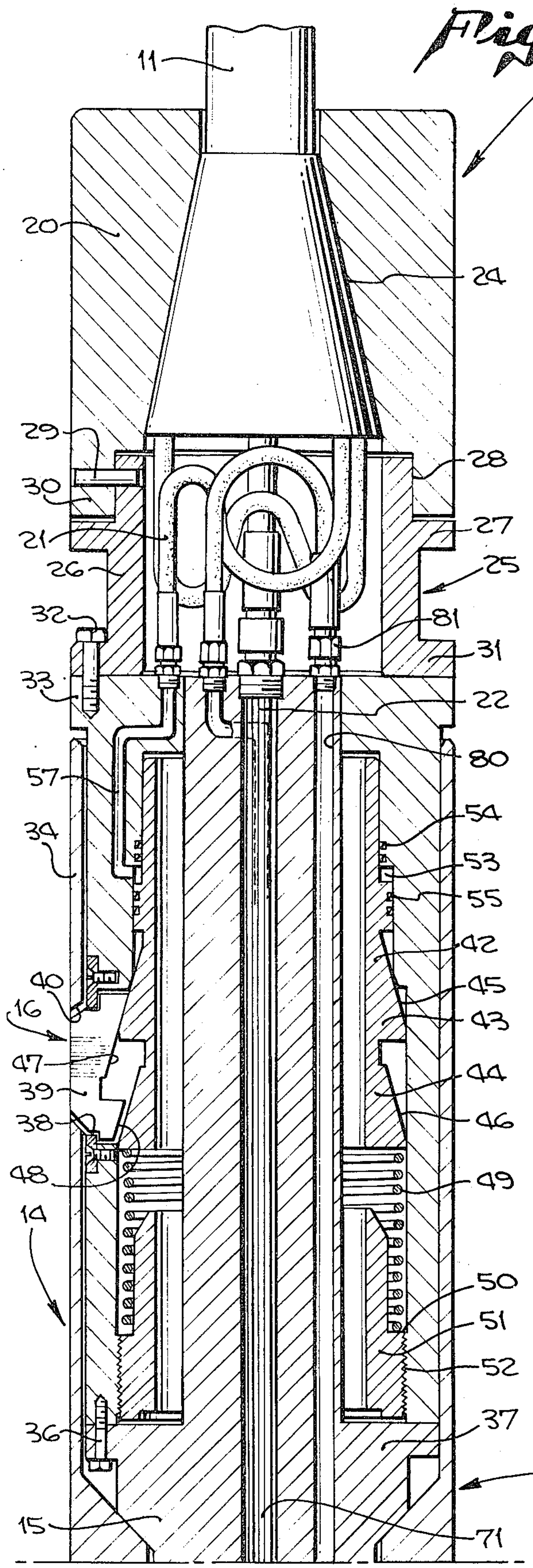

A self-purging, electrical-hydraulic connector is generally indicated at 10 and embodies the present invention. Connector 10 may be used at a selected location in an umbilical line to provide a quick connect and disconnect of both electrical and hydraulic control functions provided by such an umbilical line. An example of such use is shown in the marine riser system described and claimed in copending application Ser. No. 771,799 filed Feb. 24, 1977 and in which an umbilical line extends from a base manifold means at the sea floor to and through a buoyant structure located below the sea surface, and then from the buoyant structure to a floating platform or other surface structure. The connector 10 may be used at the top of such buoyant structure so that the upper portion of the umbilical line may be quickly disconnected from the portion of the umbilical line which extends from the buoyant structure to the seabed. Under some severe weather conditions, it may be desirable to disconnect from the lower umbilical line and buoyant structure.

Generally speaking, connector 10 interconnects an upper main control umbilical line 11 and a lower main control umbilical line 12. All of the control functions carried by umbilical line 11 are transferred to umbilical line 12 through the connector 10. Such control line functions include electrical control lines and hydraulic control lines.

Generally speaking, connector 10 comprises separable, elongated body members 14 and 15 held in assembled relation by locking means 16 at the upper end of said body members. At the lower portion of the connector, the separable body members are provided with electrical contact means 17 having construction and operation similar to the electrical connector described and claimed in our copending patent application Ser. No. 786,210 filed Apr. 11, 1977. Also adjacent the bottom portion of the connector, means 18 for transferring control fluid from the upper umbilical line 11 to the lower umbilical line 12 is provided. Actuating means comprising fluid under pressure is used to actuate the electrical contact means 17 and to actuate the hydraulic transfer means 18.

In detail, upper umbilical line 11 is suitably secured in termination block 20. Umbilical line 11 carries pressure fluid control line 21 and electrical control line 22 which are carried by and connected to receptacle body member 14 and tapered body member 15, respectively. Block 20 has a conical socket connection with umbilical line 11 as at 24.

Between block 20 and the upper ends of body members 14 and 15 may be provided an adaptor member 25 comprising a cylindrical wall 26 having a top annular flange 27 spaced from the end of wall 26 to provide a cylindrical shouldered seat as at 28 for the end of block 20. Block 20 may be secured to adaptor 25 by a shear pin 29 which extends through a cylindrical wall 30 of block 20 and into cylindrical wall 26 of the adaptor. The lower end of cylindrical wall 26 of adaptor 25 is provided with a flange 31 seated on and secured as by screw bolts 32 to the upper end of lock housing member 33. Shear pin 29 permits emergency rapid removal of the upper umbilical line 11 from the connector 10 if necessary.

Lock means 16 for the electrical connector 10 comprises lock housing 33 of cylindrical form which extends longitudinally within an upper cylindrical wall 34 of receptacle member 14 for seating and securing, as by screw bolts 36, on an enlarged annular shoulder 37 on body member 15. Lock housing 33 is provided with a plurality of angularly spaced windows 38 through which may project a plurality of angularly spaced locking dogs 39 for engagement with openings 40 provided in wall 34 for each locking dog 39.

Locking dogs 39 are radially inwardly and outwardly actuated by an axially movable locking sleeve 42 slidable within locking housing 33 and having axially spaced cam portions 43 and 44 with cam faces 45 and 46 for engagement with complementary cam faces 47 and 48 on each locking dog 39. Locking sleeve 42 is biased into dog locking relationship by a compression spring 49 seated on an annular shoulder 50 carried by a lock member 51 threaded as at 52 to the lower end of the lock housing 33. At the upper end of the locking sleeve 42 a chamber 53 is provided for pressure fluid which is contained between seals 54 and 55 carried respectively by the lock housing 33 and the locking sleeve 42. Pressure fluid is introduced into chamber 53 through passageway 57 which is connected to a pressure fluid source through one of the control lines such as 21.

It will be readily apparent that spring 49 normally biases the locking sleeve 42 into upper position wherein the locking dogs 39 are urged radially outwardly into locked relationship with the openings 40 provided in the body member 14. When the connector is to be unlocked, pressure fluid introduced into chamber 53 drives the sleeve 42 downwardly against the spring to permit the locking dogs 39 to be retracted inwardly for release of the lock housing 33 and the separable body member 15 from the body member 14 and from the lower umbilical line 12.

Connector 10 provides means for making and breaking electrical contacts at the electrical portion of the connector. The electrical contact means 17 are similar to the electrical contact means shown in copending application Ser. No. 786,210 filed Apr. 11, 1977. Briefly, such electrical contact means comprises a plurality of radially arranged and axially or longitudinally spaced groups of fixed contact discs 60 covered by elastomeric material 61 and held in a tapered conical wall 62 of body member 14 which serves as a receptacle. Electrical leads 63 are connected to the electrical contact disc 60 and are passed through a receptacle chamber 64 and through a passageway 65 in end wall 66 of the receptacle member 14 for inclusion in a cable 67 which is fed into the umbilical line 12.

Body member 15 provides an elongated, tapered configuration which corresponds to the taper of wall 62 of the receptacle member 14 and is longitudinally receivable within the chamber 68 provided in the receptacle member 14. Body member 15 includes piston-type electrical penetrating elements 70 which are juxtaposed opposite respective anvil discs 60 when the body member 15 is longitudinally, axially, and angularly positioned in chamber 68. Member 15 includes an axial, elongated chamber 71 for hydraulic pressure actuating fluid which acts against the piston-type penetrating element 70 for driving said penetrating elements through the elastomeric covering 72 and through the covering 61 for electrical contact with disc 60. The elastomeric covers 61 and 72 are so designed as to purge sea water from between the interface of said covers when the member 15 is received with the chamber 68 and when the penetrating piston elements are actuated by pressure fluid.

The means 18 for interconnecting hydraulic fluid lines from umbilical line 11 and umbilical line 12 comprise the provision of one or more longitudinally extending passageways or bores 80 in body member 15, the upper end of each bore 80 being suitably connected at 81 to suitable fluid conducting lines which extend into the umbilical line 11. The lower end of bore 80 opens into a cylinder chamber means 83 for passage of fluid through the chamber means 83 to a bore 84 in end wall 66 to a fluid conducting line 85 which forms part of the lower umbilical line 12. To pass control fluid from bore 80 through the chamber means 83 to bore 84, it will be apparent that the joint means 86 between end face 87 of body member 15 and end wall 66 must be sealed. In this example, two fluid conducting bores 80 are shown, FIG. 2. The sealing means for each bore 80 at joint means 86 is the same, only one being described for brevity.

Means for sealing joint means 86 includes a piston body 90 of cylindrical form and having an annular lower edge portion 91 provided with an annular, downwardly facing recess therein for reception of an annular elastomeric seal element 92 which projects beyond end face 87 of the piston body 90 for contact with upwardly facing surface 93 of end wall 66.

Piston body 90 includes an upper reduced cylindrical portion 95 which carried internal radially inwardly directed longitudinal ribs or flutes 96 providing an axial passageway for reception of shank 97 of a bolt 98 having an enlarged head 99 to seat a biasing spring 100 having its other end seated as at 101 against end edges of flutes 96 to bias piston body 90 upwardly into the chamber 83. In normal position the edge face of the lower end of piston body 90 may be slightly recessed within end face 87 of body member 15 to protect seal element 92 as the lower end of body member 15 is lowered into receptacle body member 14.

Seal means 103 and 104 are provided on piston body 90 and chamber means 83 to permit sliding sealed movement of the piston body 90.

Figure 1B:
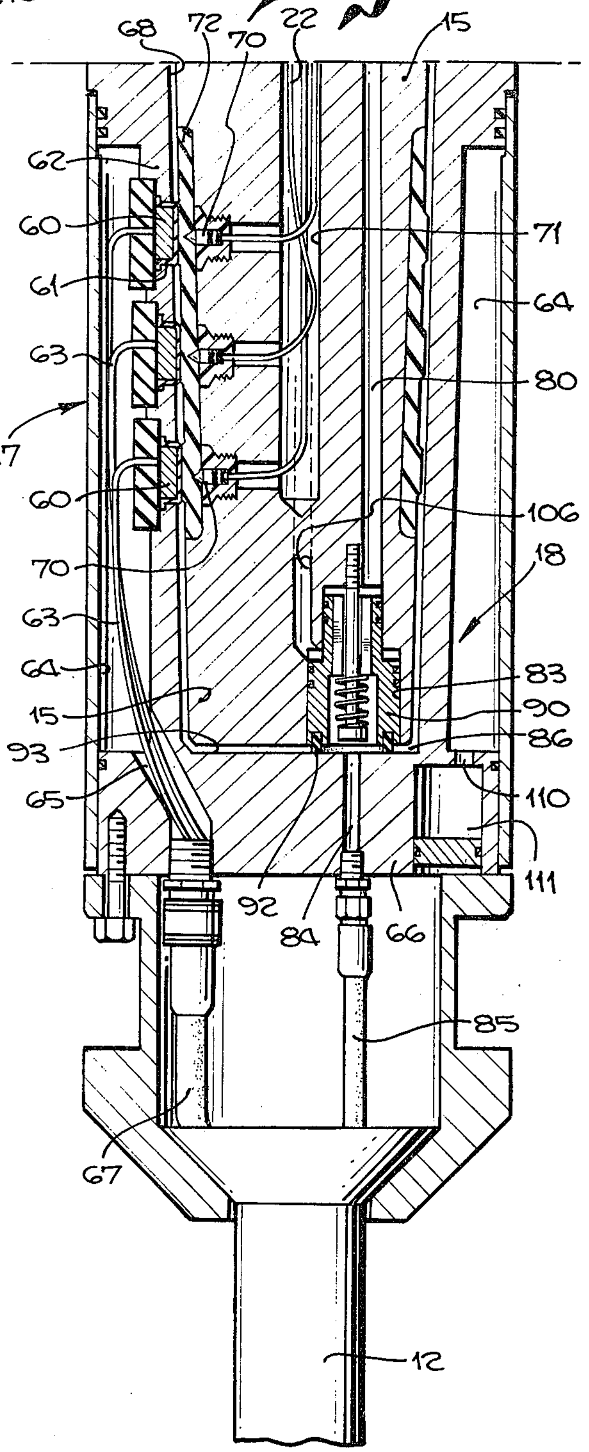

Hydraulic actuating fluid for driving piston body 90 downwardly so that seal member 92 sealingly engages surface 93 on wall 66 is provided by the hydraulic actuating pressure fluid in chamber 71 used to actuate electrical contact penetrating elements 70. As shown in FIG. 1*b*, chamber 71 is extended by a passageway 106 which is divided adjacent the upper end of chambers 83 into two passageways 107, each of which leads to the chamber 83 at the space provided between the piston body 90 and the reduced portion 95. It will be apparent that when the hydraulic actuating fluid in chamer 71 is placed under pressure that such pressure will be communicated to the piston chambers 83. When the fluid pressure actuates the electrical contacts 70 and 60, such fluid pressure will simultaneously drive the piston body 90 downwardly and cause the annular seals 92 to be pressed against the surface 93 of wall 66.

Under such sealing engagement of seal members 92 with the surface 93 and the encirclement of the passageways 84 in wall 66 thereby, control fluid being conducted in bores 80 will pass through the fluted passageways in the reduced portion of the piston body and into the chamber defined by the annular piston body 90 for flow through the bores 84 in wall 66.

When the hydraulic actuating fluid is reduced in pressure to disconnect the electrical mating contacts, at the same time the fluid pressure acting upon the piston body 90 will be reduced and the biasing springs 100 will urge the piston body 90 upwardly and unseal the seal members 92. When this occurs, pressure in the control fluids conducted in bores 80 and 84 will be reduced and fail-safe mechanically actuated valves located below the connector means will automatically close such control lines.

Upon such de-energizing of the actuating pressure fluid the tapered body member 15 may be withdrawn from the receptacle body member 14.

As described in the electrical connector of the aforementioned copending application Ser. No. 786,210 filed Apr. 11, 1977, the receptacle body member may be provided with chamber 64 filled with a dielectric oil, such chamber 64 being in communication through a port 110 with a pressure compensating piston and cylinder chamber means 111 having communication with sea water outside of said connector means.

Combined electrical-hydraulic connector 10 thus provides for simultaneous energization and de-energization of electrical control lines and fluid pressure control lines carried by control umbilical lines 11 and 12. Such simultaneous de-energization and disengagement of body member 15 with body member 14 with respect to electrical and fluid pressure control functions permits the umbilical line 11 to be made rapidly ready for retrieval. It will be understood that the lock means 16 may be connected with a line carrying pressure actuating fluid to chamber 71 so that locking of the body members 14 and 15 together may be accomplished simultaneously with energization of the control functions provided thereby and also said body members may be unlocked by change or decrease in the pressure of the actuating fluid carried in chamber 71.

In the event there should be failure in the separation of the body members for some reason, umbilical line 11 may be retrieved by applying sufficient tension thereto to shear shear pin 29. Under such emergency conditions, it will be apparent that the connector means will not be in condition for reentry of the tapered body member 15 at a later time.

Various changes and modifications may be made in the connector means 10 described above and which fall within the spirit of this invention and all such changes and modifications coming within the scope of the appended claims are embraced thereby.

I claim:

1. A combined electrical-hydraulic connector having a longitudinal axis, comprising:
means including separable, elongated body members for making and breaking electrical contacts by movement of at least one contact on one body member in a direction away from and toward said longitudinal axis;
means for conducting fluid parallel to said longitudinal axis and through said separable body members, said body members providing a separable joint means transverse to said longitudinal axis;
seal means at said separable joint means for said fluid conducting means;
said seal means being adapted to be energized into a selected compressive state to seal said joint means for passage therethrough of fluid;
and fluid actuating means for making and breaking said electrical contacts and for energizing and de-energizing said seal means for said joint means.

2. A connector as stated in claim 1 wherein
said fluid actuating means simultaneously actuates said electrical contacts and said seal means.

3. A connector as stated in claim 1 wherein
said seal means includes a biased piston located in said fluid conducting means adjacent said joint means,
and a compressible seal element carried by said biased piston for sealing contact with the body member on the opposite side of said joint means.

4. A connector as stated in claim 3 wherein
said seal means includes a biased piston carried by one of said body members in said fluid conducting means,
said piston having a seal element for sealing engagement with the other body member;
and means in said one body member providing fluid communication for said fluid actuating means for actuating said electrical contacts and said seal means.

5. A connector as stated in claim 1 including
means for locking said separable body members in both axial and angular orientation.

6. In a connector as stated in claim 5 wherein
said seal means includes a normally retracted piston and a seal element carried thereby,
said seal element being normally uncompressed in contact with said other body member when said body members are in normal locked and axial and angular oriented position.

7. In a connector as stated in claim 1 wherein said other body member includes an end wall having a passageway for conductors associated with said electrical contacts and a passageway for fluid conducted through said one body member,
said end wall including piston and cylinder means in communication with the environment external to said connector for equalizing pressure externally of the electrical contacts carried by said other body member.

8. In a combined electrical-hydraulic connector means, the combination of:

elongated, separable body members arranged in telescopic relation, defining a joint means transverse to the axis of the body members, and having passageways to conduct fluid;

seal means for the joint means to transfer between said elongated body members hydraulic pressure fluid conducted by said passageways;

electrical contact means arranged along the said body members;

fluid pressure means for simultaneously actuating said seal means and said electrical contact means;

and lock means for holding said separable body members in assembled telescopic relation.

9. In a combined electrical-fluid connector means, the combination of:

separable body members having a joint means therebetween;

electrical contact means carried by said body members for electrical engagement and disengagement;

passageway means provided in said body members for conducting fluid through said body members;

seal means at said joint means for transferring said fluid from one body member to the other body member;

and actuating means carried by one of said body members for making and breaking said electrical contact means and for energizing and de-energizing said seal means at said joint means.

10. A connector means as claimed in claim 9 wherein said actuating means includes piston means for said electrical contact means and piston means for said seal means;

said actuating means being in communication with piston means for said electrical contact means and for said seal means.

11. A connector means as claimed in claim 10 including means for normally biasing said piston means for said seal means into seal retracted position.

* * * * *